(12) United States Patent
Venugopal et al.

(10) Patent No.: US 12,081,304 B2
(45) Date of Patent: Sep. 3, 2024

(54) BEAM REPORTING ENHANCEMENTS FOR SINGLE-FREQUENCY NETWORK ENVIRONMENTS IN RADIO ACCESS NETWORKS

(71) Applicant: QUALCOMM Incorporated, San Diego, CA (US)

(72) Inventors: Kiran Venugopal, Raritan, NJ (US); Wooseok Nam, San Diego, CA (US); Tianyang Bai, Somerville, NJ (US); Sungwoo Park, Seoul (KR); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/239,303

(22) Filed: Apr. 23, 2021

(65) Prior Publication Data
US 2021/0351831 A1    Nov. 11, 2021

Related U.S. Application Data

(60) Provisional application No. 63/021,049, filed on May 6, 2020.

(51) Int. Cl.
*H04B 7/06* (2006.01)
*H04B 7/0408* (2017.01)
*H04W 24/10* (2009.01)

(52) U.S. Cl.
CPC ......... *H04B 7/0695* (2013.01); *H04B 7/0408* (2013.01); *H04B 7/0617* (2013.01); *H04W 24/10* (2013.01)

(58) Field of Classification Search
USPC ........................................................ 370/329
See application file for complete search history.

(56) References Cited

U.S. PATENT DOCUMENTS

| | | | |
|---|---|---|---|
| 10,951,285 B2* | 3/2021 | Sang | H04B 7/0617 |
| 11,363,506 B2* | 6/2022 | Awada | H04W 36/302 |

(Continued)

FOREIGN PATENT DOCUMENTS

WO    2020037207 A1    2/2020

OTHER PUBLICATIONS

International Search Report and Written Opinion—PCT/US2021/029020—ISA/EPO—Jul. 21, 2021.

(Continued)

*Primary Examiner* — Jeffrey M Rutkowski
*Assistant Examiner* — Luna Weissberger
(74) *Attorney, Agent, or Firm* — Patterson & Sheridan, L.L.P/Qualcomm Incorporated

(57) ABSTRACT

Certain aspects of the present disclosure provide a method for performing beam measurements in a wireless communication network, including: performing a measurement of a first beam from a first transmission and reception point (TRP) of a network; performing a measurement of a second beam from a plurality of TRPs of the network; applying a biasing factor to one of the measurement of the first beam or the measurement of the second beam based on a beam preference setting; and transmitting, to the network, a measurement report including: indications of the first beam and second beam to which the measurement report pertains; and the measurement of the first beam and the measurement of the second beam after applying the biasing factor.

30 Claims, 11 Drawing Sheets

(56) References Cited

U.S. PATENT DOCUMENTS

| | | | |
|---|---|---|---|
| 2018/0199328 A1* | 7/2018 | Sang | H04B 7/0617 |
| 2019/0297603 A1 | 9/2019 | Guo et al. | |
| 2020/0059290 A1* | 2/2020 | Pan | H04B 7/088 |
| 2020/0153581 A1* | 5/2020 | Tsai | H04W 24/10 |
| 2021/0167821 A1* | 6/2021 | Chen | H04B 7/0408 |
| 2022/0109483 A1* | 4/2022 | Nilsson | H04B 7/0695 |

OTHER PUBLICATIONS

Lenovo, et al., "Discussion of Enhancement for Multi-TRP/Multi-Panel Transmission", 3GPP Draft, 3GPP TSG RAN WG 1 Meeting #94bis, R1-1810571, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051517978, 8 Pages, Retrieved from the Internet: URL: http://www.3gpp.org/ftp/tsg%5Fran/WG1%5FRL1/TSGR1%5F94b/Docs/R1%2D1810571%2Ezip. [retrieved on Sep. 28, 2018], The Whole Document.

Samsung: "Discussion on TX Beam Grouping Configuration for Multi-panel TRP and Multi-TRP", 3GPP Draft, 3GPP TSG RAN WG1 Meeting #90bis, R1-1717610, 3rd Generation Partnership Project (3GPP), Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017 (Oct. 8, 2017), 6 Pages, XP051340796, Retrieved from the Internet: URL: http://www.3gpp.org/ftp/Meetings_3GPP_SYNC/RAN1/Docs/. [Retrieved on Oct. 8, 2017], The Whole Document.

\* cited by examiner

BEAM REPORTING ENHANCEMENTS FOR SINGLE-FREQUENCY NETWORK ENVIRONMENTS IN RADIO ACCESS NETWORKS

CROSS-REFERENCE TO RELATED APPLICATIONS

This Application claims the benefit of and priority to U.S. Provisional Patent Application No. 63/021,049, filed May 6, 2020, the entire contents of which are incorporated herein by reference.

BACKGROUND

Field of the Disclosure

Aspects of the present disclosure relate to wireless communications, and more particularly, to techniques for beam reporting enhancements for single-frequency network functionality in a radio access network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam reporting in single-frequency network environments.

In a first aspect, a method for performing beam measurements in a wireless communication network, includes: performing a measurement of a first beam from a first transmission and reception point (TRP) of a network; performing a measurement of a second beam from a plurality of TRPs of the network; applying a biasing factor to one of the measurement of the first beam or the measurement of the second beam based on a beam preference setting; and transmitting, to the network, a measurement report including: indications of the first beam and second beam to which the measurement report pertains; and the measurement of the first beam and the measurement of the second beam after applying the biasing factor.

In a second aspect, a method for performing beam measurements in a wireless communication network, includes: transmitting to a user equipment a report configuration, including: a set of reference signals to measure corresponding to at least a first beam and a second beam; and a quantity type to report for a measurement of the first beam and a measurement of the second beam, wherein: the first beam is configured to be transmitted by a first transmission and reception point (TRP) of a network, and the second beam is configured to be transmitted by a plurality of TRPs of the network; and receiving from the user equipment a measurement report including the measurement of the first beam and the measurement of the second beam after a biasing factor has been applied by the user equipment to at least one of the measurement of the first beam or the measurement of the second beam.

In a third aspect, a method for performing beam measurements in a wireless communication network, includes: performing first measurements of a first plurality of beams from a first transmission and reception point (TRP) of a network; performing second measurements of a second plurality of beams, wherein each beam of the second plurality of beams is from a plurality of TRPs of the network; selecting a best beam from the first plurality of beams based on the first measurements; selecting a best beam from the second plurality of beams based on the first measurements; transmitting, to the network, a measurement report including: a measurement of the best beam from the first plurality of beams; and a measurement of the best beam from the second plurality of beams.

In a fourth aspect, a method for performing beam measurements in a wireless communication network, includes: transmitting to a user equipment a report configuration, including: a set of reference signals to measure corresponding to a first plurality of beams from a first transmission and reception point (TRP) of a network and a second plurality of beams from a plurality of TRPs of the network; and a quantity type to report for measurements of the first plurality of beams and measurement of the second plurality of beams; and receiving from the user equipment a measurement report including: a measurement of a best beam from the first plurality of beams; and a measurement of a best beam from the second plurality of beams.

In a fifth aspect, a method for performing beam measurements in a wireless communication network, includes: performing first measurements of a first plurality of beams from a first transmission and reception point (TRP) of a network; performing second measurements of a second plurality of beams, wherein each beam of the second plurality of beams is from a plurality of TRPs of the network; selecting a best beam from the first plurality of beams and the second plurality of beams based on the first measurements and the second measurements; transmitting, to the network, a measurement report including: a measurement of the best beam; and an indication of whether the best beam is received from the first TRP or the plurality of TRPs.

In a sixth aspect, a method for performing beam measurements in a wireless communication network, includes: transmitting to a user equipment a report configuration, including: a set of reference signals to measure corresponding to a first plurality of beams from a first transmission and reception point (TRP) of a network and a second plurality of beams, wherein each beam of the second plurality of beams is from a plurality of TRPs of the network; and a quantity type to report for measurements of the first plurality of beams and measurements of the second plurality of beams; and receiving from the user equipment a measurement report including: a measurement of a best beam from the first plurality of beams and the second plurality of beams; and an indication of whether the best beam is received from the first TRP or the plurality of TRPs.

Further aspects of the present disclosure provide means for, apparatus, processors, and computer-readable mediums for performing the methods described herein.

To the accomplishment of the foregoing and related ends, the one or more aspects include the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
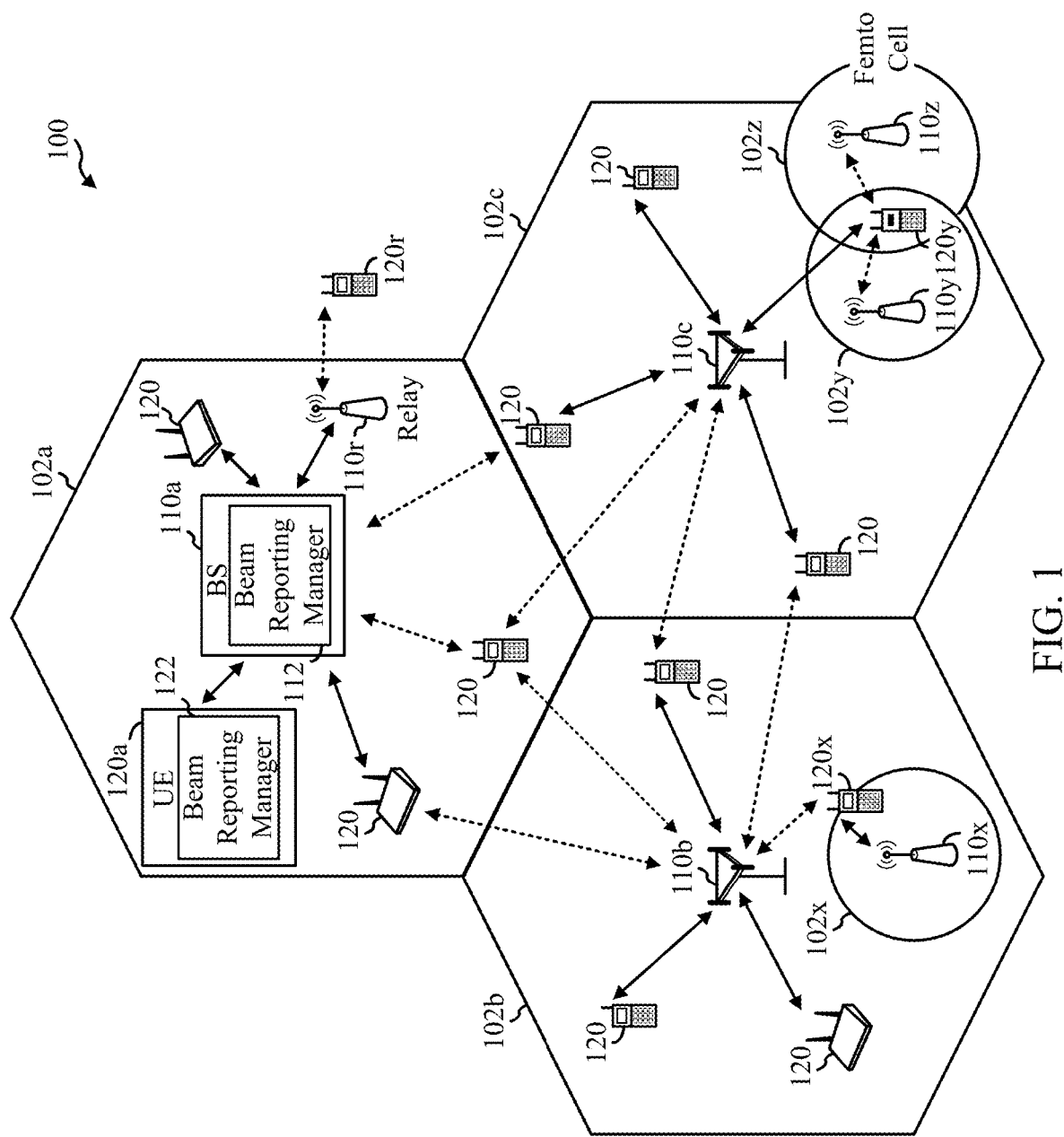
FIG. 1 is a block diagram conceptually illustrating an example wireless communication network, in accordance with certain aspects of the present disclosure.
Figure 1:
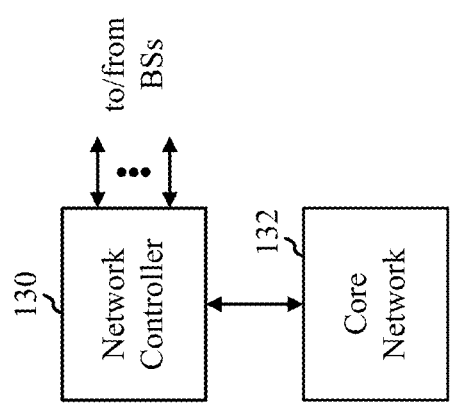

Aspects of the present disclosure provide apparatus, methods, processing systems, and computer-readable mediums for enhanced beam reporting in single-frequency network (SFN) environments within a radio access network.

The following description provides examples of beam reporting enhancements in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. In some cases, each frequency may support a single RAT in a given geographic area in order to avoid interference between wireless networks of different RATs.

The techniques described herein may be used for various wireless networks and radio access technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR further supports beamforming and beam direction may be dynamically configured. MIMO transmissions with precoding may also be supported in NR. For example, MIMO configurations in the DL may support up to 8 transmit antennas with multi-layer DL transmissions up to 8 streams and up to 2 streams per UE. Further, multi-layer transmissions with up to 2 streams per UE may be supported in NR. Aggregation of multiple cells may be supported with up to 8 serving cells in NR.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipments (UEs) 120 in the wireless communication network 100 via one or more interfaces.

According to certain aspects, the BSs 110 and UEs 120 may be configured for enhanced beam reporting in SFN environments. As shown in FIG. 1, the BS 110a includes a beam reporting manager 112 that is configured to perform the beam reporting methods described herein, such as those described with respect to FIGS. 5, 6B, 7, 8B, and 9B. The UE 120a includes a beam reporting manager 122 that is configured to perform the beam reporting methods described herein, such as those described with respect to FIGS. 5, 6A, 7, 8A, and 9A.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may generally support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for those BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
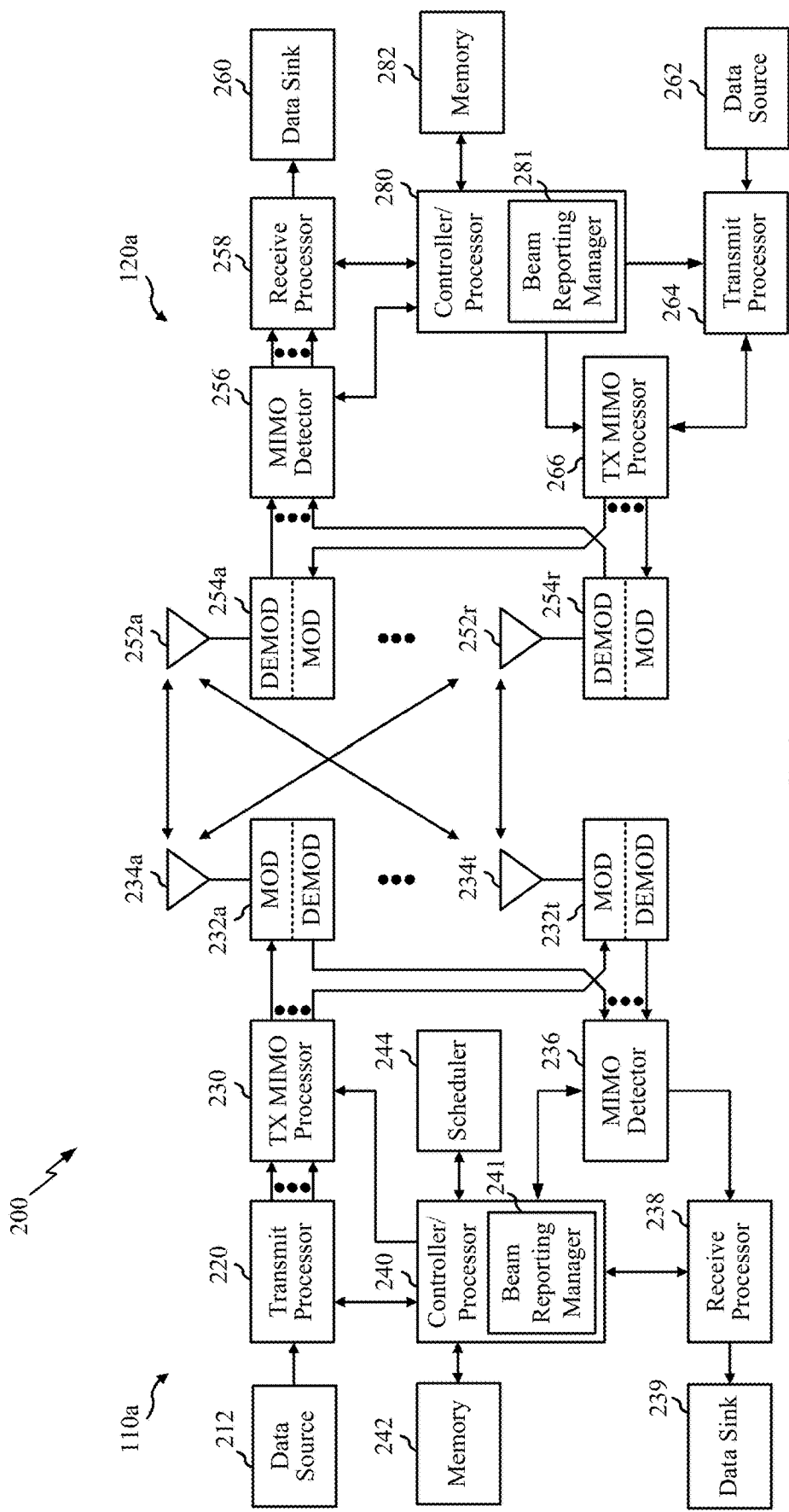
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

In some aspects, each antenna 234a-234t may be an aspect of one or more transmission and reception points (TRPs). Generally, a base station, such as 110a, may include and/or control a plurality of TRPs.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols to other aspects of UE 120a. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam reporting manager 241 configured to perform the beam reporting methods described herein. As shown in FIG. 2, the controller/processor 280 of the UE 120a has a beam reporting manager 281 configured to perform the beam reporting methods described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
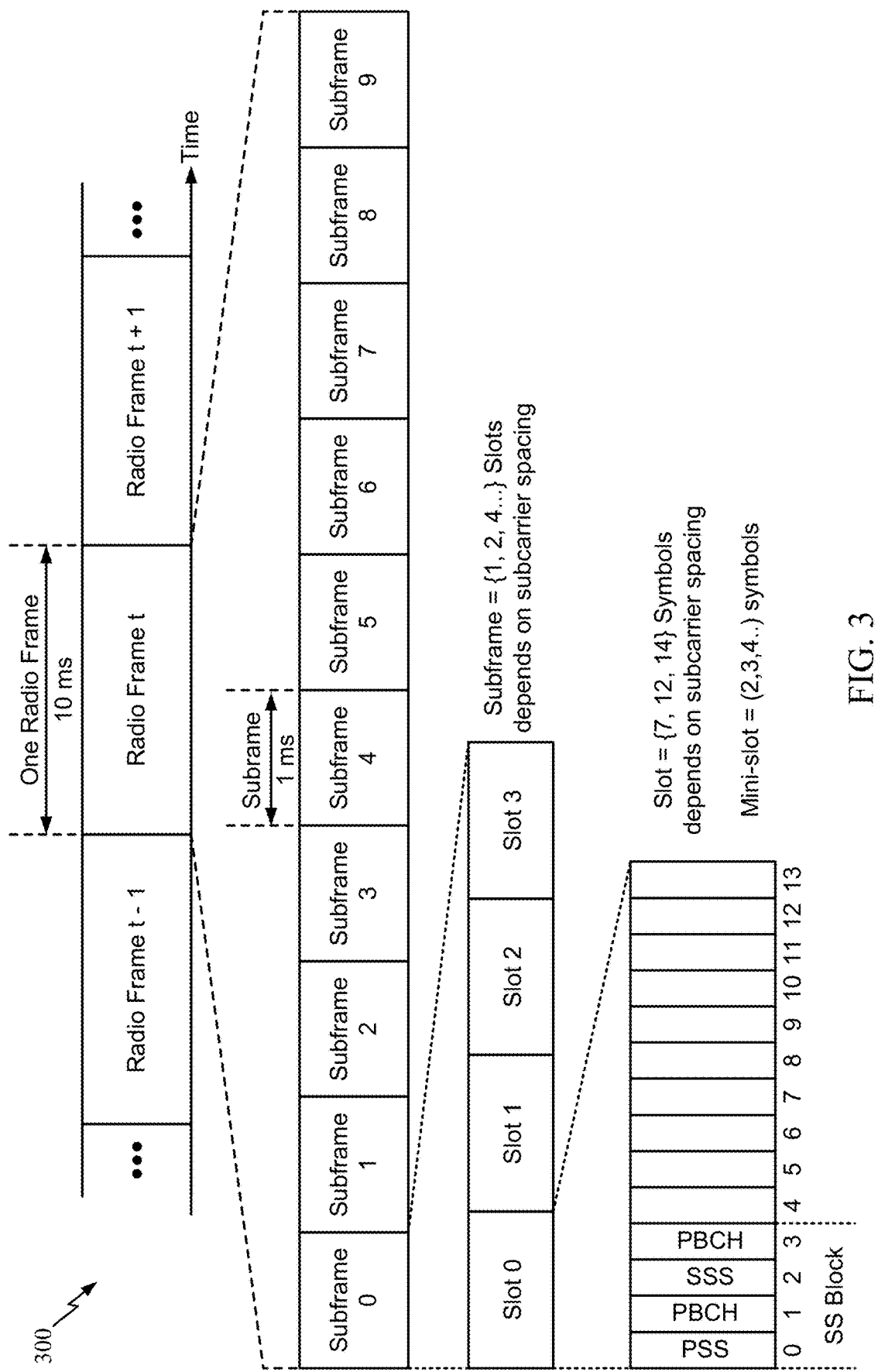
FIG. 3 is an example frame format for certain wireless communication systems (e.g., new radio (NR)).

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The primary synchronization signal (PSS) and secondary synchronization signal (SSS) may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Multiple Beam Operation in Radio Access Networks Including Single-Frequency Network Functionality A single-frequency network (SFN) is generally a broadcast network where several transmitters simultaneously send the same signal over the same frequency channel. In wireless data networks, such as 5G NR, SFN is one of various multiple transmission and reception point (multi-TRP) techniques, which improve reliability, coverage, and capacity performance through flexible deployment scenarios in a radio access network.

Figure 4:
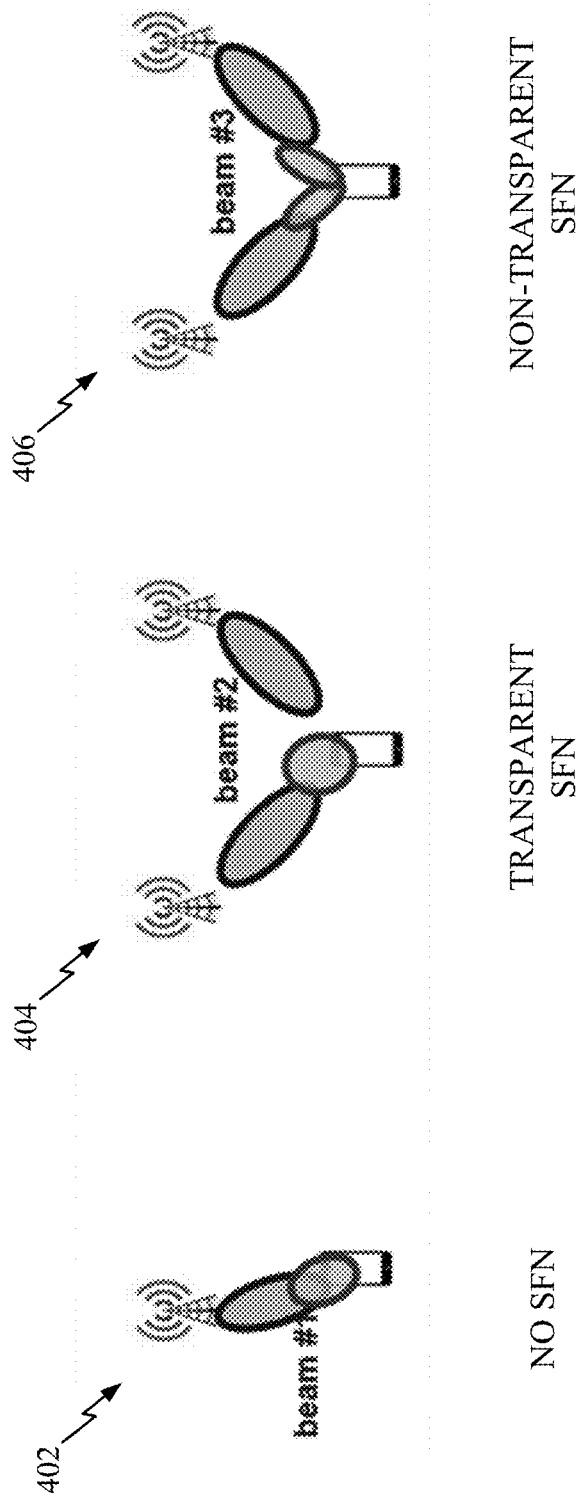
FIG. 4 depicts an example of various beam operation scenarios in a radio access network, such as a 5G NR network.

FIG. 4 depicts an example of various beam operation scenarios in a radio access network, such as a 5G NR network.

In scenario 402, a single TRP (e.g., antenna 234a of base station 110a in FIG. 2) transmits a beam to a user equipment (e.g., user equipment 120a in FIG. 2).

In scenario 404, multiple TRPs are transmitting multiple beams (e.g., via two or more of antenna 234a-234t of base station 110a in FIG. 2) to the user equipment using a SFN transmit function. In scenario 404, the user equipment is not aware that the beams are from separate TRPs, and thus this scenario may be referred to as "transparent SFN". This sort of configuration may generally be implemented as a purely base station side function. While easier to implement, a consequence of the transparency to the user equipment is that the user equipment is not able to configure multiple TRP-specific reception beams.

In scenario 406, multiple TRPs are again transmitting multiple beams (e.g., via two or more of antenna 234a-234t of base station 110a in FIG. 2) to the user equipment using a SFN transmit function. However, in scenario 406, the user equipment is aware that the beams are from separate TRPs, and thus this scenario may be referred to as "non-transparent SFN". This sort of configuration may generally be implemented as a function within the base station and the user equipment, such as in the beam reporting components 241 and 281 in FIG. 2. Awareness of the SFN configuration allows the user equipment to beneficially configure multiple TRP-specific reception beams, and thereby to further improve reception performance.

Generally, the trade-off between scenarios 404 and 406 is between additional signaling overhead and optimal performance using advanced reception beam determination flexibility.

To enable measurement and reporting on a set of beams, as depicted in scenarios 404 and 406, a reporting framework based on report configurations or settings can be used. Generally, a user equipment can be configured to carry out different types of measurements, in most cases with corresponding reporting to the network. In general, such measurement and corresponding reporting are configured by means of a report configuration or setting, such as a CSI-ReportConfig in in the 3GPP specifications.

Each report configuration or setting may generally indicate, for example, a specific quantity or set of quantities to be reported, a set of downlink resource(s) in which measurements should be carried out in order to derive the quantity or quantities to be reported, and how the reporting is to be carried out, such as, when the reporting is to be performed and what uplink physical channel to use for the reporting.

More specifically, when performing beam reporting, a resource configuration may include, for example, a set of reference signals to measure on, corresponding to a set of beams, which may be included in the resource set associated with a report configuration or setting. The resource set may include, for example, a set of configured CSI-RS or a set of SS blocks.

In some aspects, for beam reporting, the measurement and reporting may be described by a report configuration having Layer 1 received-signal received-power (L1-RSRP) as the quantity to be reported, though Layer 1 signal-to-interference-plus-noise ratio (L1-SINR) may also be used. For example, a "reportQuantity: may include a "ssb-Index-RSRP", "cri-RSRP" , "cri-SINR", or "ssb-Index-SINR" in some aspects.

Generally, a user equipment may be configured to report measurements corresponding to four reference signals (e.g., CSI-RS or SS blocks), which may relate to four beams, in a single reporting instance. Each such report may include, for example: indications of the four reference signals (e.g., related to four beams) that the specific report relates to; a measured (e.g., actual) L1-RSRP or L1-SINR for the strongest reference signal/beam; and differential measurements for the remaining reference signals/beams, which are measured based on the difference between the subject beam and the strongest reference signal/beam. In some cases, the CSI-RS and/or SSB resources can be received simultaneously by the user equipment either with a single beam or with multiple simultaneous beams.

In some aspects, a user equipment may be selectably configured for group reporting of beam measurements. For example, with group reporting disabled, the user equipment may include measurements for four beams per report setting, whereas with group reporting enabled, the user equipment may include measurements for two different groups of beams.

In some aspects, the measurement associated with the strongest reference signal/beam may be quantized differently than a differential measurement. For example, the measurement associated with the strongest reference signal/beam may be more accurate and have smaller step size as compared to the differential measurements. In one example, the measurement associated with the strongest reference signal/beam may be quantized in a range of 6-8 bits and the differential measurements may be quantized in a range of 3-5 bits. Other configurations are possible.

Unfortunately, conventional beam reporting does not include a mechanism to differentiate between SFN and non-SFN beam reports, which in some cases is due to the implementation of transparent SFN operational modes. Because it is desirable to achieve the higher performance gains of non-transparent SFN, such as for higher throughput and reliability given the user equipment's ability to configure specific reception beams, there is a need for enhanced beam reporting methods to enable full utilization of SFN network functions.

Biasing Beam Reports in SFN Environments to Influence Beam Selection

Aspects of the present disclosure provide methods for performing multiple beam reporting in SFN environments.

Figure 5:
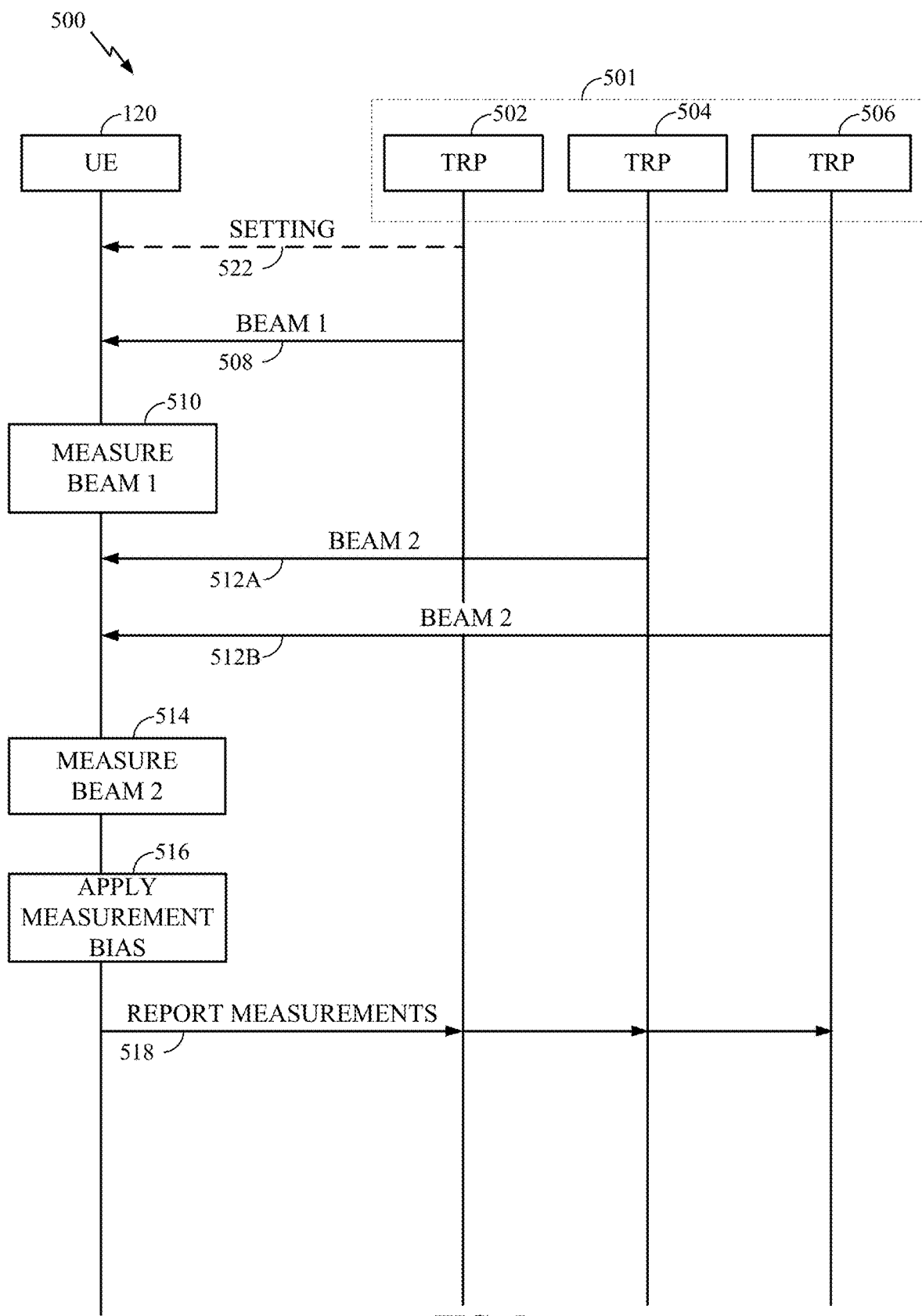
FIG. 5 depicts a message flow diagram illustrating example operations for wireless communication.

FIG. 5 depicts an example message flow diagram illustrating example operations 500 for wireless communication, in accordance with certain aspects of the present disclosure. The operations 500 may be performed, for example, by user equipment (e.g., the UE 120a in the wireless communication network 100) and elements of a network 501 (e.g., transmit and reception points of BS 110a in the wireless communication network 100). In some aspects, the operations 500 may be implemented as software components that are executed and run on one or more processors (e.g., controllers/processors 240 and 280 of FIG. 2). Further, the transmission and reception of signals by the UE and the network in operations 500 may be enabled, for example, by one or more antennas (e.g., antennas 252 and 234 of FIG. 2). In certain aspects, the transmission and/or reception of signals by the UE and the network (e.g., by a base station of the network) may be implemented via a bus interface of one or more processors (e.g., controllers/processors 240 and 280) obtaining and/or outputting signals.

Operations 500 begin at 508 with UE 120 receiving a first beam 508 from a first transmission and reception point (TRP) 502. In this example, beam 508 is an example of a non-SFN beam.

Operations 500 then proceed to 510 where UE 120 measures beam 508. For example, the UE may measure various characteristics of beam 508, including a L1-SINR or L1-RSRP associated with the beam.

Operations 500 then proceed to 512A and 512B, where UE 120 receives a second beam 512 from two different TRPs (504 and 506), for example, using a single-frequency network (SFN) transmission function or mode. Thus, beam 512 may be referred to as an SFN-beam, where the same beam is transmitted from a plurality of TRPs on the same frequency, such as beam 512A from TRP 504 and beam 512B from TRP 506.

Operations 500 then proceed to 514 where UE 120 measures second beam 512.

UE 120 may be configured to treat non-SFN beams (e.g., 508) differently from SFN-beams (e.g., 512) for purposes of beam reporting. For example, when operations 500 proceed to 516, UE 120 may apply a measurement bias to one or more of the beam measurements.

In one example, the measurements of the non-SFN beam at 510 and the measurements of the SFN beam at 514 may be scaled or biased, such as by a scaling or biasing factor. The scaling or biasing factor may be configured to increase or decrease a selected type of measurement (e.g., non-SFN or SFN), which may thereby bias the network towards using a selected type of beam (e.g., non-SFN or SFN) to communicate with UE 120.

In some aspects, the scaling or biasing factor may be applied to a single type of beam measurement, such as only to SFN-beams. In other aspects, the scaling or biasing factor may be applied only to a preferred type of beam, which may be configured by the UE or the network. In yet further aspects, the biasing factor may be applied to measurements associated with both types of beams. For example, a biasing factor of b may be applied to a first type of beam measurement (e.g., non-SFN) and a complimentary biasing factor of 1−b may be applied to a second type of beam measurement (e.g., SFN). Generally, the scaling or biasing factor may be applied according to any scheme that will cause a bias to be applied to the selection of beam types for communication between the network and UE 120.

In some aspects, a scaling or biasing factor may be configured for separate resource or report settings for different types of beams, such as SFN and non-SFN beams. In other aspects, the scaling or biasing factor may be applied based on measurements of different beam types (e.g., SFN and non-SFN) within a same resource set defined by a report setting.

Operations 500 then proceed to 518 where UE 120 reports the beam measurements to the network, such as by transmission to one or more of network elements 501.

In some aspects, the network may configure UE 120 with the scaling or biasing factor as part of a beam preference setting, such as via setting 522. Note that while depicted as coming from TRP 502, the beam preference setting may be configured in UE 120 by any network element, including elements not depicted in FIG. 5.

Figure 6A:
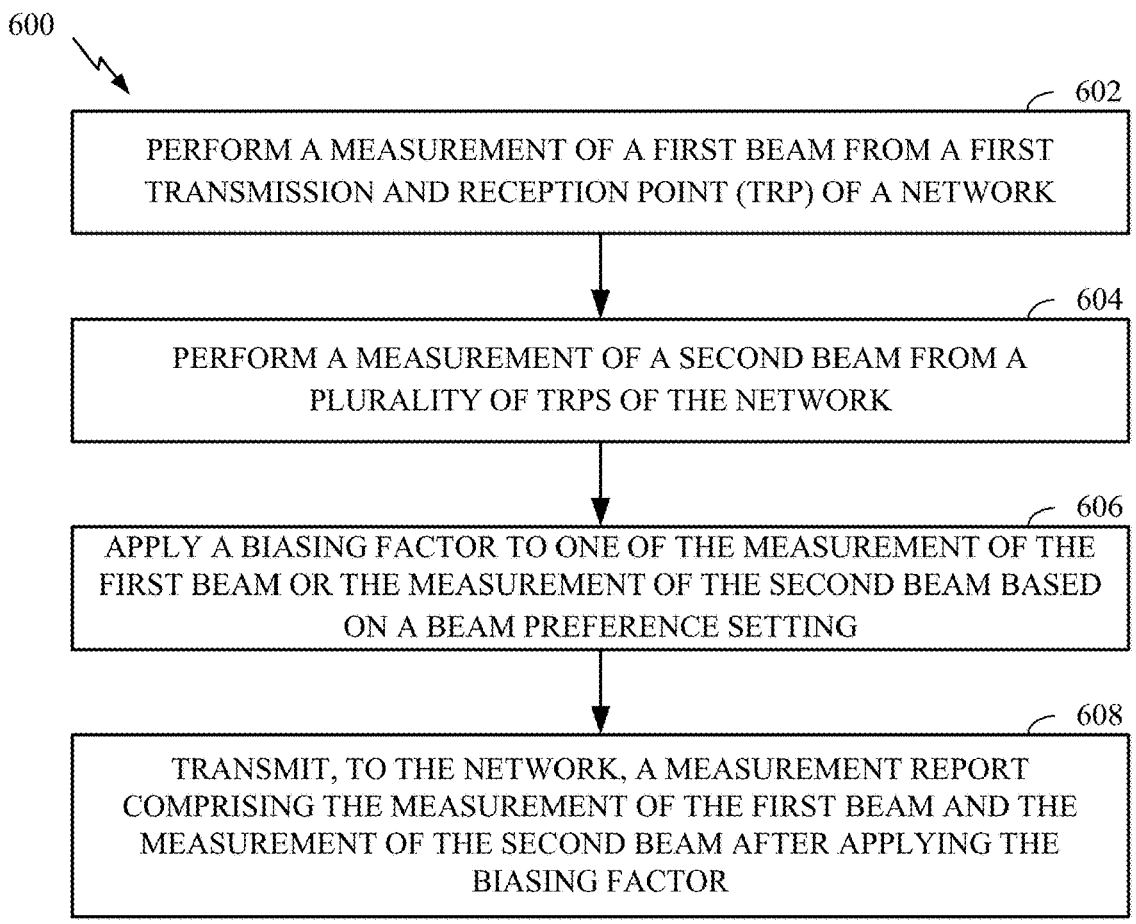
FIG. 6A depicts an example method for wireless communication.

FIG. 6A depicts an example method 600 for wireless communication, in accordance with certain aspects of the present disclosure. Method 600 may be performed, for example, by user equipment (e.g., UE 120a in the wireless communication network 100 in FIGS. 1 and 2). In some aspects, method 600 may be implemented as software components that are executed and run on one or more processors (e.g., controller/processor 280 of FIG. 2). Further, the transmission and reception of signals by the UE in method 600 may be enabled, for example, by one or more antennas (e.g., antennas 252 of FIG. 2). In certain aspects, the transmission and/or reception of signals by the UE may be implemented via a bus interface of one or more processors (e.g., controllers/processors 280) obtaining and/or outputting signals. Further, in some aspects, a beam reporting manager (e.g., 281 in FIG. 2) may be configured to perform some or all steps of method 600.

Method 600 begins at step 602 with performing a measurement of a first beam from a first transmission and reception point (TRP) of a network.

Method 600 then proceeds to step 604 with performing a measurement of a second beam from a plurality of TRPs of the network.

Method 600 then proceeds to step 606 with applying a biasing factor to at least one of the measurement of the first beam or the measurement of the second beam based on a beam preference setting.

Method 600 then proceeds to step 608 with transmitting, to the network, a measurement report. In some aspects, the measurement report comprises indications of the first beam and second beam to which the measurement report pertains. Further, in some aspects the measurement report comprises the measurement of the first beam and the measurement of the second beam after applying the biasing factor.

Some aspects of method 600 further include determining a strongest beam based on the measurement of the first beam and the measurement of the second beam after applying the biasing factor. In some aspects, the measurement report may further include a measurement of the strongest beam reported as an actual value, and one or more measurements of one or more other beams, other than the strongest beam, reported as differential values.

In some aspects of method 600, the measurement of the first beam and the measurement of the second beam comprise Layer 1 received-signal received-power (L1-RSRP) measurements.

In some aspects of method 600, the measurement of the first beam and the measurement of the second beam comprise Layer 1 signal-to-interference-plus-noise ratio (L1-SINR) measurements.

Some aspects of method 600 further include receiving, from the network, a report configuration, comprising: a set of reference signals to measure corresponding to at least the first beam and the second beam; and a quantity type to report for the measurement of the first beam and the measurement of the second beam.

Some aspects of method 600 further include receiving, from the network, a first report configuration, including: a first set of reference signals to measure corresponding to the first beam; a second set of reference signals to measure corresponding to the second beam; and a quantity type to report for the measurement of the first beam and the measurement of the second beam.

Figure 6B:
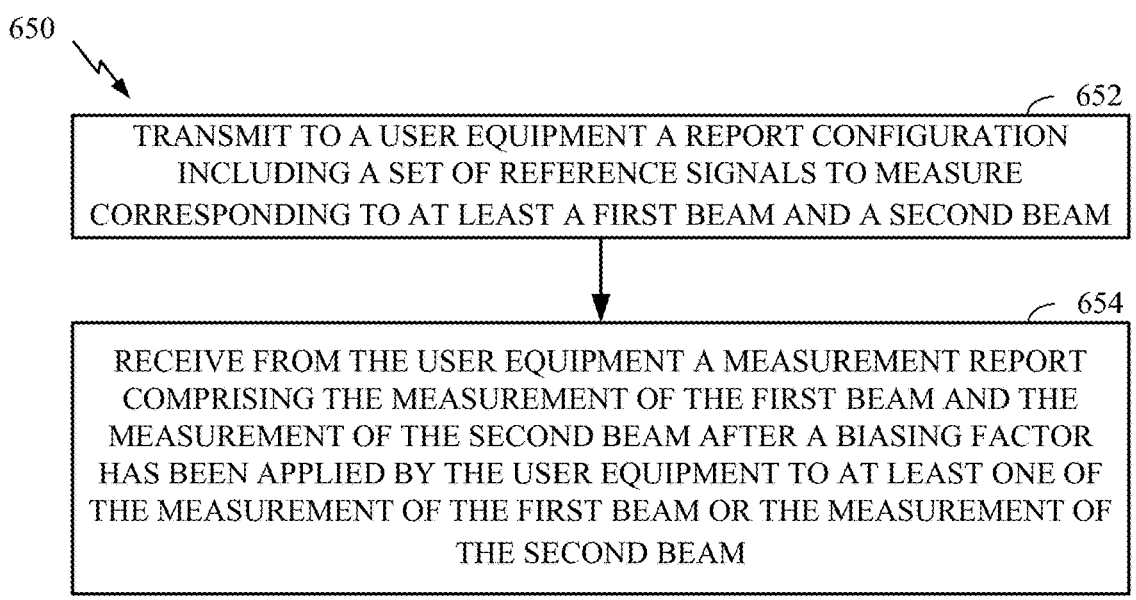
FIG. 6B depicts another example method for wireless communication.

FIG. 6B depicts an example method 650 for wireless communication, in accordance with certain aspects of the present disclosure. Method 650 may be performed, for example, by a network element (e.g., BS 110a in the wireless communication network 100 of FIGS. 1 and 2). In some aspects, method 650 may be implemented as software components that are executed and run on one or more processors (e.g., controller/processor 240 of FIG. 2). Further, the transmission and reception of signals by the network element in method 650 may be enabled, for example, by one or more antennas (e.g., antennas 234 of FIG. 2). In certain aspects, the transmission and/or reception of signals by the network element may be implemented via a bus interface of one or more processors (e.g., controllers/processors 240) obtaining and/or outputting signals. Further, in some aspects, a beam reporting manager (e.g., 241 in FIG. 2) may be configured to perform some or all steps of method 650.

Method 650 begins at step 652 with transmitting to a user equipment a report configuration (or setting).

In some aspects, the report configuration includes a set of reference signals to measure corresponding to at least a first beam and a second beam, wherein the first beam is configured to be transmitted by a first transmission and reception point (TRP) of a network, and the second beam is configured to be transmitted by a plurality of TRPs of the network.

Further, in some aspects, the report configuration includes a quantity type to report for a measurement of the first beam and a measurement of the second beam. In some aspects, the quantity type comprises a Layer 1 received-signal received-power (L1-RSRP). In some aspects, the quantity type comprises a Layer 1 signal-to-interference-plus-noise ratio (L1-SINR).

Further, in some aspects, the report configuration includes a beam preference setting, which may include a scaling or biasing factor meant to be applied to beam measurements in order to influence beam selection.

Method 650 then proceeds to step 654 with receiving from the user equipment a measurement report including the measurement of the first beam and the measurement of the second beam after a biasing factor has been applied by the user equipment to at least one of the measurement of the first beam or the measurement of the second beam.

In some aspects of method 650, the measurement report further includes a measurement of a strongest beam reported as an absolute value, and a measurement of one or more other beams, other than the strongest beam, reported as a differential value.

Figure 7:
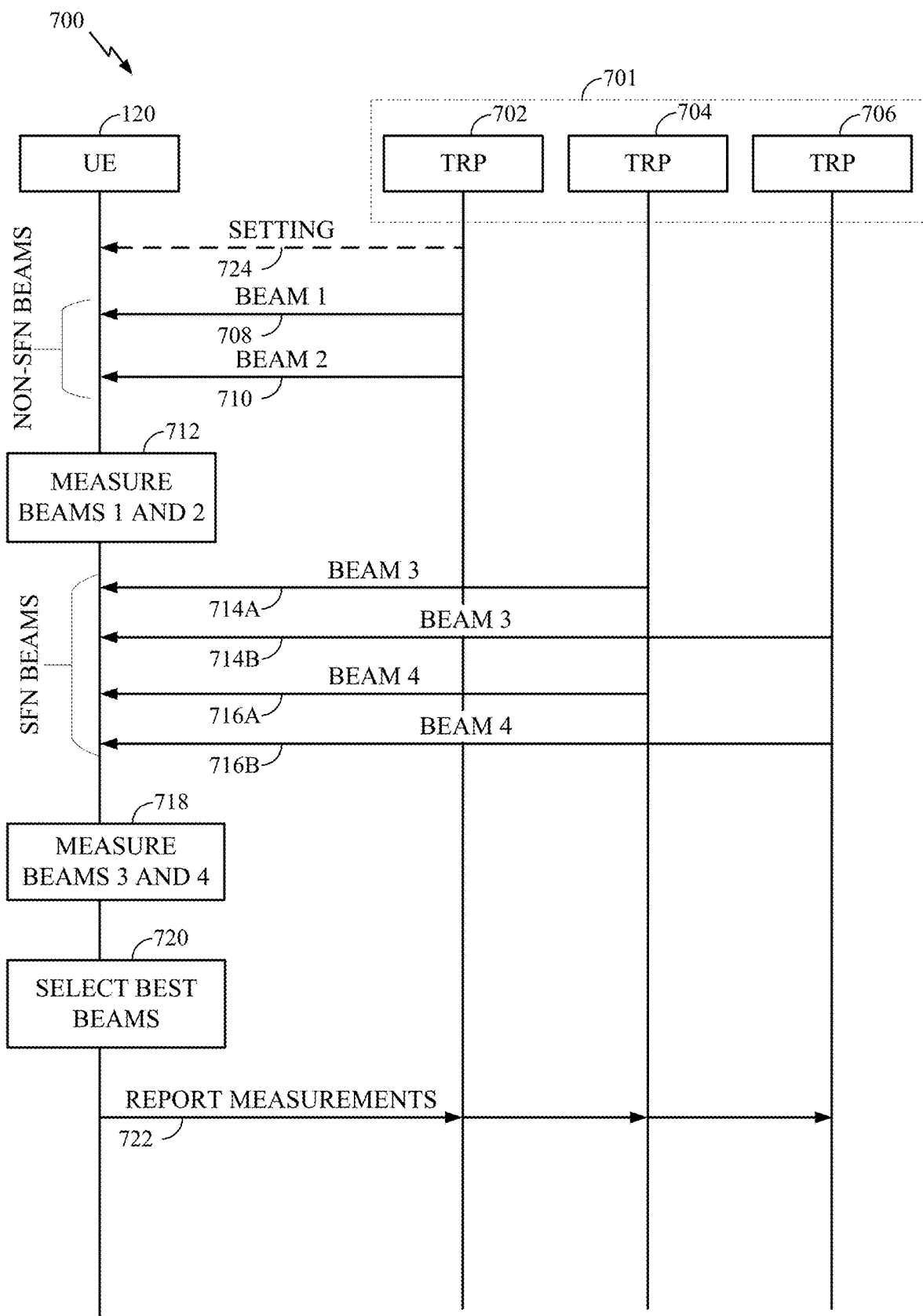
FIG. 7 depicts an example message flow diagram illustrating example operations for wireless communication.

Handling Beam Measurements Differently Based on Beam Type in a Beam Measurement Report FIG. 7 depicts an example message flow diagram illustrating example operations 700 for wireless communication, in accordance with certain aspects of the present disclosure. Operations 700 may be performed, for example, by user equipment (e.g., the UE 120a in the wireless communication network 100) and elements of a network 720 (e.g., transmit and reception points of BS 110a in the wireless communication network 100). In some aspects, operations 700 may be implemented as software components that are executed and run on one or more processors (e.g., controllers/processors 240 and 280 of FIG. 2). Further, the transmission and reception of signals by the UE and the network in operations 700 may be enabled, for example, by one or more antennas (e.g., antennas 252 and 234 of FIG. 2). In certain aspects, the transmission and/or reception of signals by the UE and the network (e.g., by a base station of the network) may be implemented via a bus interface of one or more processors (e.g., controllers/processors 240 and 280 of FIG. 2) obtaining and/or outputting signals.

Operations 700 begin at 708 where UE 120 receives a first beam 508 from a first transmission and reception point (TRP) 702. In this example, beam 508 is an example of a non-SFN beam.

Operations 700 then proceed to 710 where UE 120 receives a second beam 708 from the first TRP 702. In this example, beam 710 is another non-SFN beam.

Operations 700 then proceed to 712 where UE 120 measures beams 708 and 710. For example, the UE may measure various characteristics of beams 708 and 710, including a L1-SINR or L1-RSRP for each beam.

Operations 700 then proceed to 714A and 714B, where UE 120 receives a third beam 714 from two different TRPs (704 and 706), for example, using a single-frequency network (SFN) transmission function or mode. Beam 714 is thus an SFN-beam transmitted from a plurality of TRPs on the same frequency, such as beam 714A from TRP 704 and beam 714B from TRP 706.

Operations 700 then proceed to 716A and 716B, where UE 120 receives a fourth beam 716 from TRPs 704 and 706 using the SFN transmission function or mode. Beam 716, like beam 714, is an SFN-beam transmitted from a plurality of TRPs.

Operations 700 then proceed to 718 where UE 120 measures third and fourth beams 714 and 716.

Operations 700 then proceed to 720 where UE 120 selects best beams for reporting. Here again, UE 120 may be configured to treat non-SFN beams (e.g., 708 and 710) differently from SFN-beams (e.g., 714 and 716) for purposes of beam reporting.

For example, according to a first beam measurement reporting strategy, a best beam may be separately selected among the SFN beam set (714 and 716 in this example) and the non-SFN beam set (708 and 710 in this example). Further, characteristics measured by UE 120 may be reported according to beam type. For example, differential beam measurements may be reported with respect to the best beam of a particular type and reported separately.

As another example, according to a second beam measurement reporting strategy, a best beam may be selected commonly among the SFN beam set (714 and 716 in this example) and the non-SFN beam set (708 and 710 in this example). Further, characteristics measured by UE 120 may be reported with reference to the best overall beam (e.g., selected from the superset of SFN and non-SFN beams). For example, differential beam measurements may be reported with respect to the overall best beam regardless of beam type. In some aspects, reported measurements (e.g., L1-SINR or L1-RSRP) may include a beam type indicator, which in some cases may be a single bit indicating whether a specific beam measurement (e.g., of the best beam) is an SFN beam or a non-SFN beam.

Operations 700 then proceed to 722 where UE 120 reports the beam measurements to the network, such as by transmission to one or more of network elements 701.

In some aspects, the network may configure UE 120 with a beam measurement reporting setting, such as via setting 724, which may configure the UE between different beam measurement reporting strategies, such as those described above.

Further, the beam measurement reporting setting (e.g., setting 724) may configure quantization settings for different measurement types, such as a first quantization setting for the best beams and a second quantization setting for the differential beam measurements. In some cases, the quantization setting may be the same for both actual beam measurements (e.g., for the best beams) and for differential beam measurements.

Note that while depicted as coming from TRP 702, the beam measurement reporting setting may be configured in UE 120 by any network element, including elements not depicted in FIG. 7.

Figure 8A:
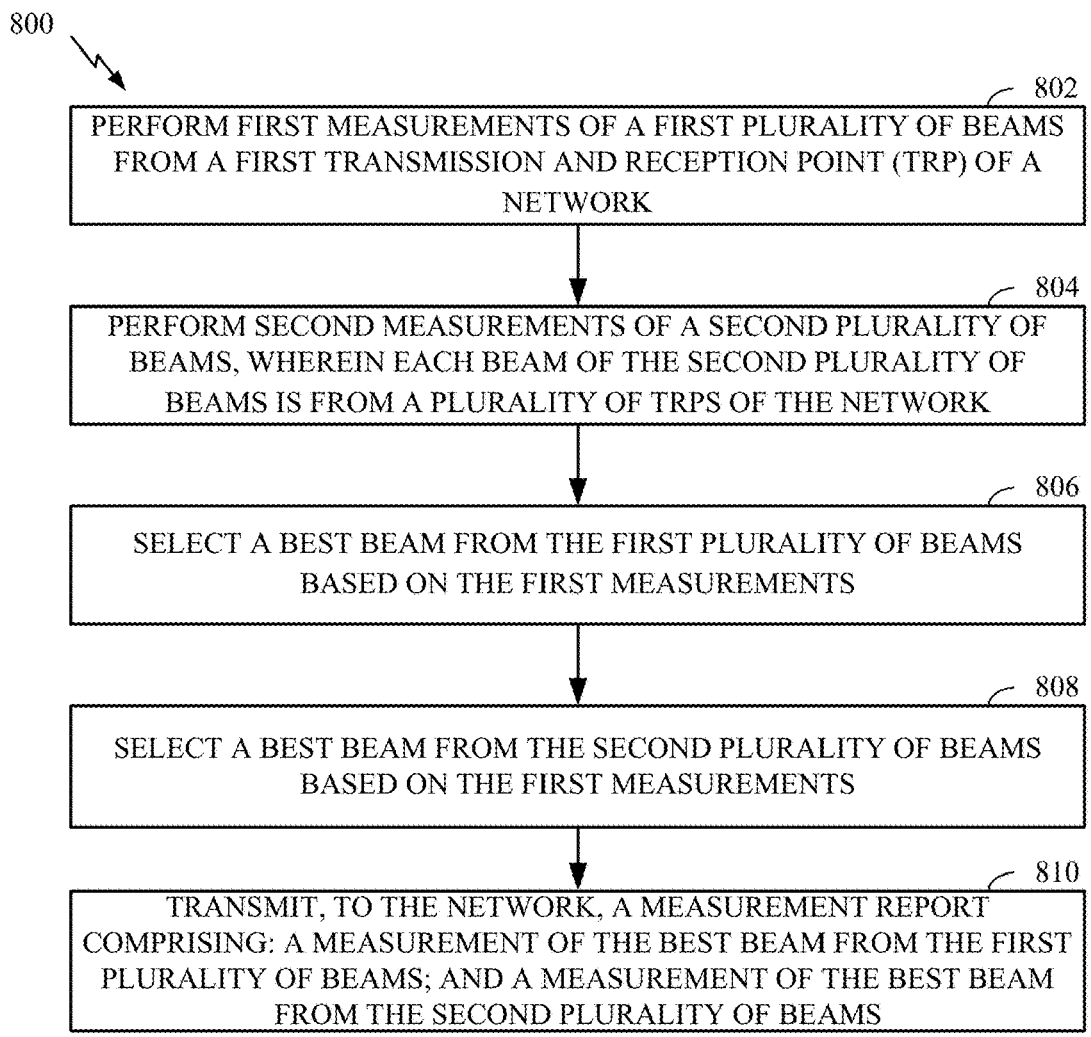
FIG. 8A depicts an example method for wireless communication.

FIG. 8A depicts an example method 800 for wireless communication, in accordance with certain aspects of the present disclosure. Method 800 may be performed, for example, by user equipment (e.g., UE 120a in the wireless communication network 100 in FIGS. 1 and 2). In some aspects, method 800 may be implemented as software components that are executed and run on one or more processors (e.g., controller/processor 280 of FIG. 2). Further, the transmission and reception of signals by the UE in method 800 may be enabled, for example, by one or more antennas (e.g., antennas 252 of FIG. 2). In certain aspects, the transmission and/or reception of signals by the UE may be implemented via a bus interface of one or more processors (e.g., controllers/processors 280 of FIG. 2) obtaining and/or outputting signals. Further, in some aspects, a beam reporting manager (e.g., 281 in FIG. 2) may be configured to perform some or all steps of method 800.

Method 800 begins at step 802 with performing first measurements of a first plurality of beams from a first transmission and reception point (TRP) of a network.

Method 800 then proceeds to step 804 with performing second measurements of a second plurality of beams, wherein each beam of the second plurality of beams is from a plurality of TRPs of the network.

Method 800 then proceeds to step 806 with selecting a best beam from the first plurality of beams based on the first measurements.

Method 800 then proceeds to step 808 with selecting a best beam from the second plurality of beams based on the first measurements.

Method 800 then proceeds to step 810 with transmitting, to the network, a measurement report comprising a measurement of the best beam from the first plurality of beams and a measurement of the best beam from the second plurality of beams. In some aspects, the only measurements for beams included in the measurement report are the measurements for the best beams from the first and second plurality of beams.

In some aspects of method 800, the measurement of the best beam from the first plurality of beams comprises a first actual value of a measurement quantity type, and the measurement of the best beam from the second plurality of beams comprises a second actual value of the measurement quantity type. In some aspects, the measurement report further includes one or more measurements of one or more other beams in the first plurality of beams, other than the best beam from the first plurality of beams, reported as differential values of the measurement quantity type, and one or more measurements of one or more other beams in the second plurality of beams, other than the best beam from the second plurality of beams, reported as differential values of the measurement quantity type.

In some aspects of method 800, the differential values associated with the one or more other beams in the first plurality of beams use a first quantization size, and the differential values associated with the one or more other beams in the second plurality of beams use a second quantization size, different from the first quantization size.

In some aspects of method 800, the differential values associated with the one or more other beams in the first plurality of beams and the differential values associated with the one or more other beams in the second plurality of beams use a same quantization size.

In some aspects of method 800, the first measurements of the first plurality of beams and the second measurements of the second plurality of beams comprise Layer 1 received-signal received-power (L1-RSRP) measurements.

In some aspects of method 800, the first measurements of the first plurality of beams and the second measurements of the second plurality of beams comprise Layer 1 signal-to-interference-plus-noise ratio (L1-SINR) measurements.

In some aspects, method 800 further includes receiving, from the network, a report configuration, comprising a set of reference signals to measure corresponding to at least the first plurality of beams and the second plurality of beams and a quantity type to report for the measurements of the first plurality of beams and the measurements of the second plurality of beams.

In some aspects, the report configuration may further include a beam measurement reporting strategy selection.

In some aspects, the report configuration may further include quantization settings for different measurement types, such as a first quantization setting for the best beams and a second quantization setting for the differential beam measurements.

Figure 8B:
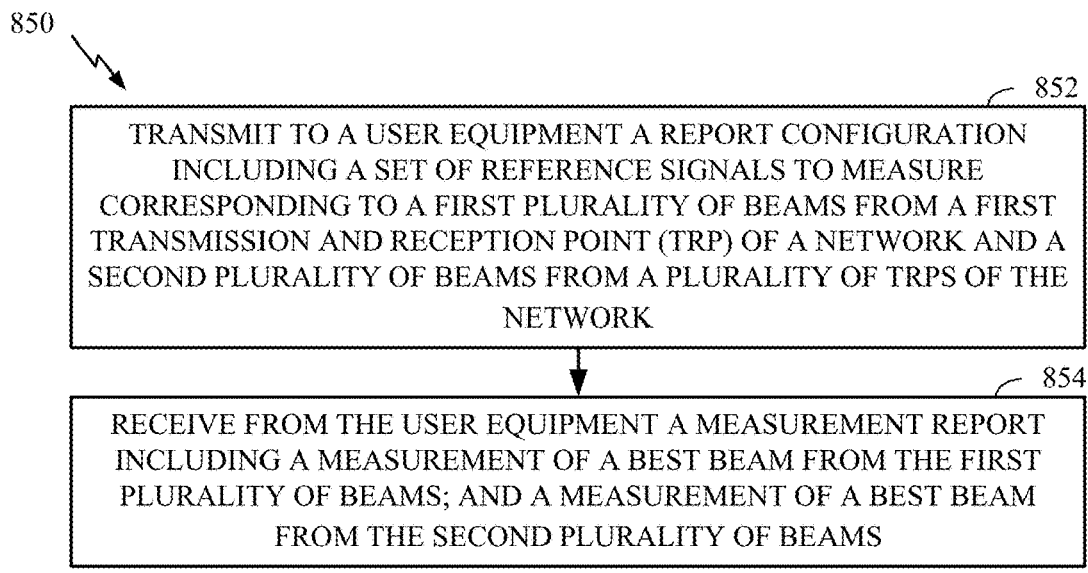
FIG. 8B depicts another example method for wireless communication.

FIG. 8B depicts an example method 850 for wireless communication, in accordance with certain aspects of the present disclosure. Method 850 may be performed, for example, by a network element (e.g., BS 110a in the wireless communication network 100 of FIGS. 1 and 2). In some aspects, method 850 may be implemented as software components that are executed and run on one or more processors (e.g., controller/processor 240 of FIG. 2). Further, the transmission and reception of signals by the network element in method 850 may be enabled, for example, by one or more antennas (e.g., antennas 234 of FIG. 2). In certain aspects, the transmission and/or reception of signals by the network element may be implemented via a bus interface of one or more processors (e.g., controllers/processors 240 of FIG. 2) obtaining and/or outputting signals. Further, in some aspects, a beam reporting manager (e.g., 241 in FIG. 2) may be configured to perform some or all steps of method 850.

Method 850 begins at step 852 with transmitting to a user equipment a report configuration. In some aspects, the report configuration includes a set of reference signals to measure corresponding to a first plurality of beams from a first transmission and reception point (TRP) of a network and a second plurality of beams from a plurality of TRPs of the network. In some aspects, the report configuration further includes a quantity type to report for measurements of the first plurality of beams and measurement of the second plurality of beams.

Method 850 then proceeds to step 854 with receiving from the user equipment a measurement report. In some aspects, the measurement report includes a measurement of a best beam from the first plurality of beams and a measurement of a best beam from the second plurality of beams.

In some aspects of method 850, the measurement of the best beam from the first plurality of beams comprises a first actual value of a measurement quantity type, and the measurement of the best beam from the second plurality of beams comprises a second actual value of the measurement quantity type.

In some aspects of method 850, the measurement report further includes one or more measurements of one or more other beams in the first plurality of beams, other than the best beam from the first plurality of beams, reported as differential values of the measurement quantity type.

In some aspects of method 850, the measurement report further includes one or more measurements of one or more other beams in the second plurality of beams, other than the best beam from the second plurality of beams, reported as differential values of the measurement quantity type.

In some aspects of method 850, the quantity type comprises one of a Layer 1 received-signal received-power (L1-RSRP) or a Layer 1 signal-to-interference-plus-noise ratio (L1-SINR).

Figure 9A:
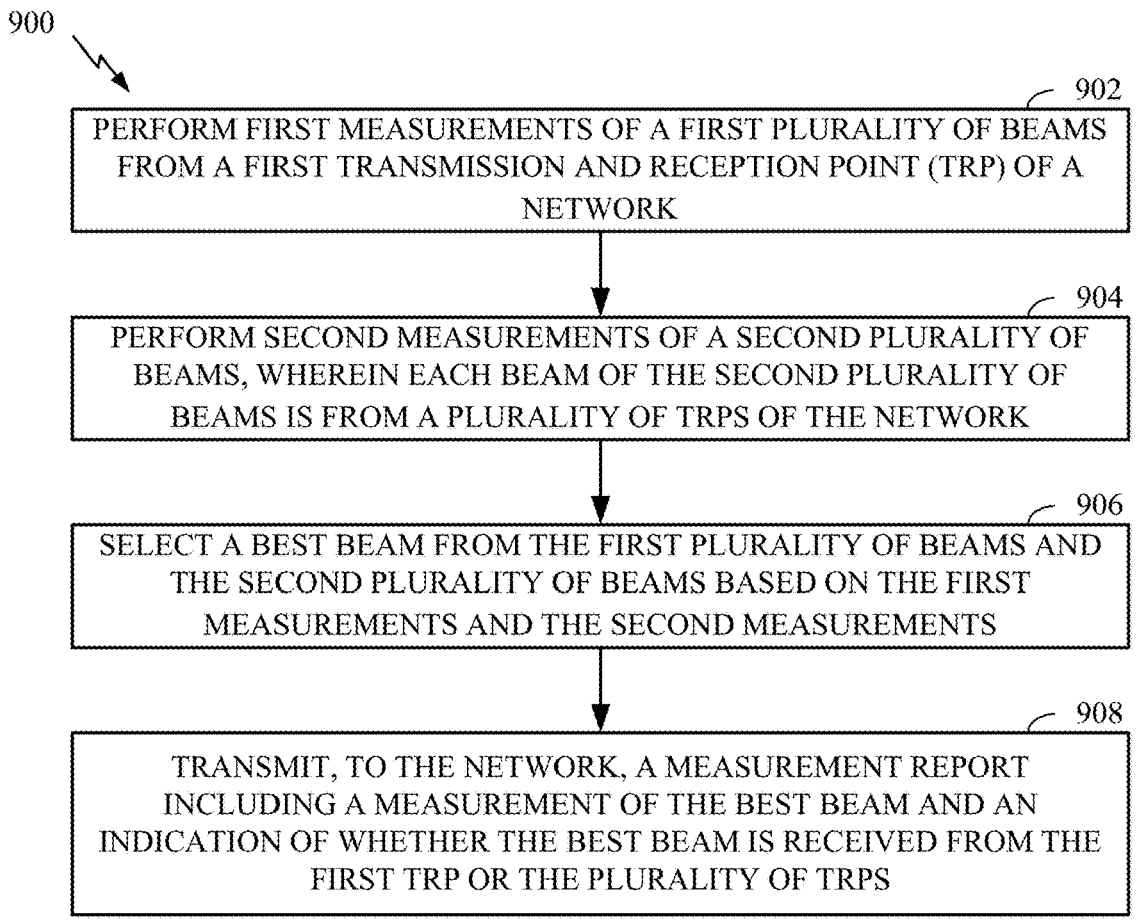
FIG. 9A depicts another example method for wireless communication.

FIG. 9A depicts an example method 900 for wireless communication, in accordance with certain aspects of the present disclosure. Method 900 may be performed, for example, by user equipment (e.g., UE 120a in the wireless communication network 100 in FIGS. 1 and 2). In some aspects, method 900 may be implemented as software components that are executed and run on one or more processors (e.g., controller/processor 280 of FIG. 2). Further, the transmission and reception of signals by the UE in method 900 may be enabled, for example, by one or more antennas (e.g., antennas 252 of FIG. 2). In certain aspects, the transmission and/or reception of signals by the UE may be implemented via a bus interface of one or more processors (e.g., controllers/processors 280 of FIG. 2) obtaining and/or outputting signals. Further, in some aspects, a beam reporting manager (e.g., 281 in FIG. 2) may be configured to perform some or all steps of method 900.

Method 900 begins at step 902 with performing first measurements of a first plurality of beams from a first transmission and reception point (TRP) of a network, such as depicted in FIG. 7 with respect to beams 708 and 710.

Method 900 then proceeds to step 904 with performing second measurements of a second plurality of beams, wherein each beam of the second plurality of beams is from a plurality of TRPs of the network, such as depicted in FIG. 7 with respect to beams 714A-B and 716A-B.

Method 900 then proceeds to step 906 with selecting a best beam from the first plurality of beams and the second plurality of beams based on the first measurements and the second measurements.

Method 900 then proceeds to step 906 with transmitting, to the network, a measurement report. In some aspects, the measurement report includes a measurement of the best beam; and an indication of whether the best beam is received from the first TRP or the plurality of TRPs. In some aspects, the indication may include a single bit, wherein the value of the single bit indicates either a non-SFN beam or an SFN beam.

In some aspects of method 900, the measurement of the best beam comprises an actual value of a measurement quantity type. In some aspects of method 900 the measurement report further comprises one or more measurements of one or more other beams from one or both of the first plurality of beams and the second plurality of beams, other than the best beam, reported as differential values of the measurement quantity type. In some aspects of method 900, each respective measurement of the one or more measurements of the one or more other beams comprises an indication of whether the respective beam is received from the first TRP or the plurality of TRPs.

In some aspects, method 900 further includes quantizing the differential values using a first quantization size or a second quantization size based on the indication of whether the best beam is received from the first TRP or the plurality of TRPs.

In some aspects of method 900, the measurement quantity type comprises a Layer 1 received-signal received-power (L1-RSRP). In some aspects of method 900 the measurement quantity type comprises a Layer 1 signal-to-interference-plus-noise ratio (L1-SINR) measurements.

In some aspects, method 900 further includes receiving, from the network, a report configuration. In some aspects, the report configuration includes: a set of reference signals to measure corresponding to at least the first plurality of beams and the second plurality of beams; and a quantity type to report for the first measurements of the first plurality of beams and the second measurements of the second plurality of beams.

Figure 9B:
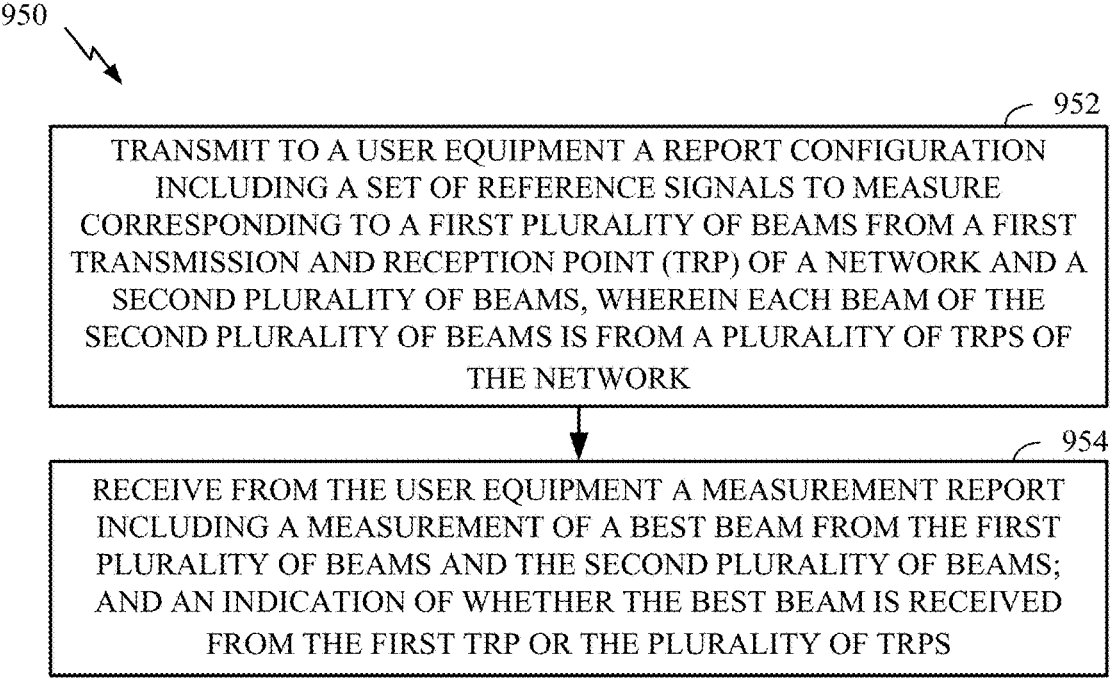
FIG. 9B depicts another example method for wireless communication.

FIG. 9B depicts a method 950 for wireless communication, in accordance with certain aspects of the present disclosure. Method 950 may be performed, for example, by a network element (e.g., BS 110a in the wireless communication network 100 of FIGS. 1 and 2). In some aspects, method 950 may be implemented as software components that are executed and run on one or more processors (e.g., controller/processor 240 of FIG. 2). Further, the transmission and reception of signals by the network element in method 950 may be enabled, for example, by one or more antennas (e.g., antennas 234 of FIG. 2). In certain aspects, the transmission and/or reception of signals by the network element may be implemented via a bus interface of one or more processors (e.g., controllers/processors 240 of FIG. 2) obtaining and/or outputting signals. Further, in some aspects, a beam reporting manager (e.g., 241 in FIG. 2) may be configured to perform some or all steps of method 950.

Method 950 begins at step 952 with transmitting to a user equipment a report configuration. In some aspects, the report configuration includes a set of reference signals to measure corresponding to a first plurality of beams from a first transmission and reception point (TRP) of a network and a second plurality of beams, wherein each beam of the second plurality of beams is from a plurality of TRPs of the network. In some aspects, the report configuration further includes a quantity type to report for measurements of the first plurality of beams and measurements of the second plurality of beams.

Method 950 then proceeds to step 954 with receiving from the user equipment a measurement report. In some aspects, the measurement report includes a measurement of a best beam from the first plurality of beams and the second plurality of beams and an indication of whether the best beam is received from the first TRP or the plurality of TRPs.

In some aspects of method 950, the measurement of the best beam comprises an actual value of a measurement quantity type.

In some aspects of method 950, the measurement report further includes one or more measurements of one or more other beams from one or both of the first plurality of beams and the second plurality of beams, other than the best beam, reported as differential values of the measurement quantity type. In some aspects of method 950, each respective measurement of the one or more measurements of the one or more other beams comprises an indication of whether the respective beam is received from the first TRP or the plurality of TRPs.

In some aspects of method 950, the quantity type comprises one of a Layer 1 received-signal received-power (L1-RSRP) or a Layer 1 signal-to-interference-plus-noise ratio (L1-SINR).

Example Communication Devices

Figure 10:
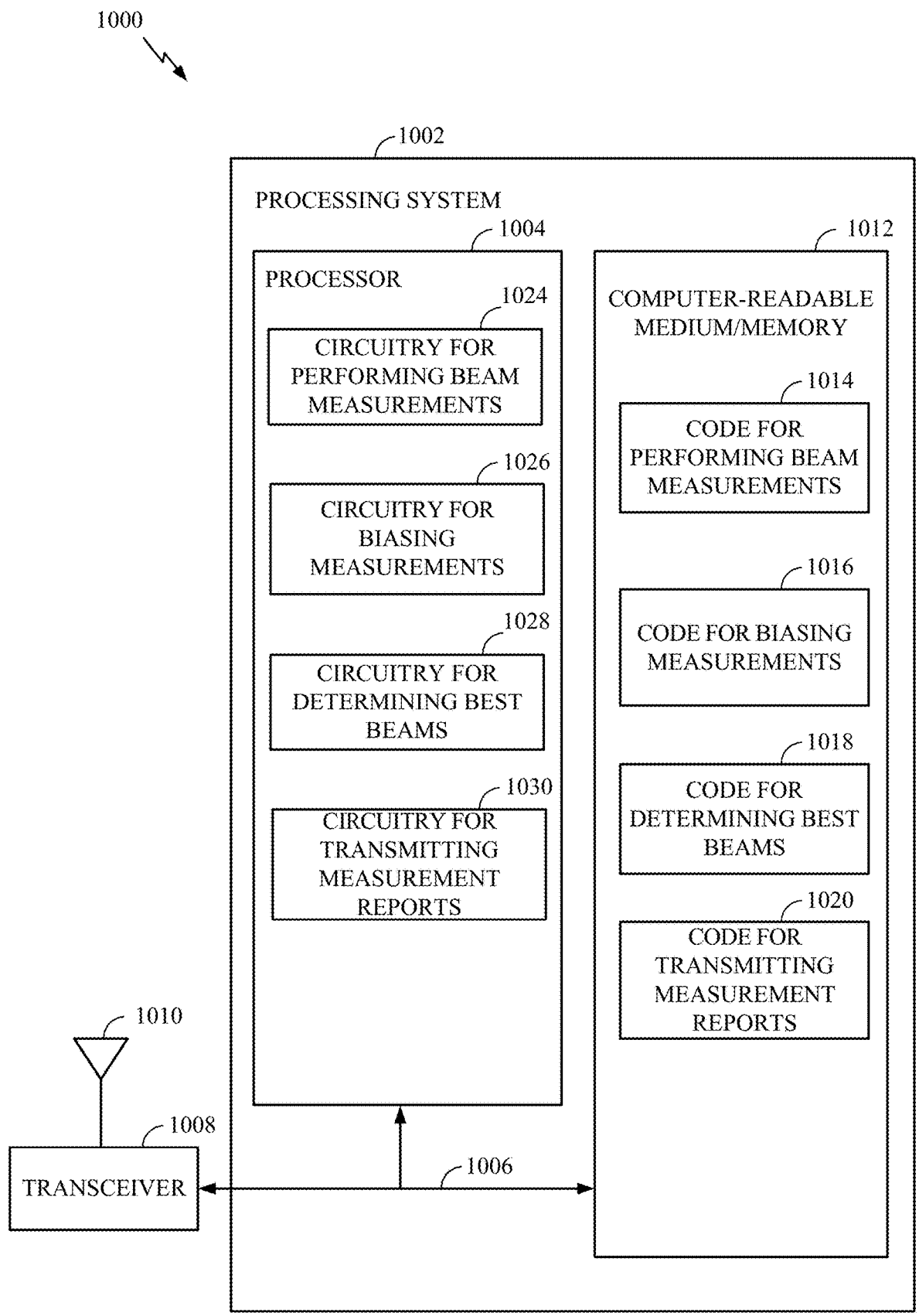
FIG. 10 depicts an example communications device that may include various components configured to perform operations for the techniques disclosed herein.

FIG. 10 depicts a communications device 1000 that may include various components (e.g., corresponding to means-plus-function components) configured to perform operations for the techniques disclosed herein, such as the operations illustrated in FIGS. 5, 6A, 7, 8A, and 9A. In some aspects, communications device 1000 may be a user equipment, such as UE 120 described with respect to FIGS. 1 and 2.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 5, 6A, 7, 8A, and 9A, or other operations for performing the various techniques discussed herein for enhanced beam reporting in single-frequency network (SFN) environments within a radio access network.

In certain aspects, computer-readable medium/memory 1012 stores code 1014 for performing beam measurements; code 1016 for biasing beam measurements; code 1018 for determining best beams; and code 1020 for transmitting beams reports. In certain aspects, the processor 1004 has circuitry configured to implement the code stored in the computer-readable medium/memory 1012. The processor 1004 includes circuitry 1024 for performing beam measurements; circuitry 1026 for biasing beam measurements; circuitry 1028 for determining best beams; and circuitry 1030 for transmitting beams reports.

Notably, FIG. 10 is just one example, and other examples with further circuitry and further code configured to perform the various functions described herein are possible.

Figure 11:
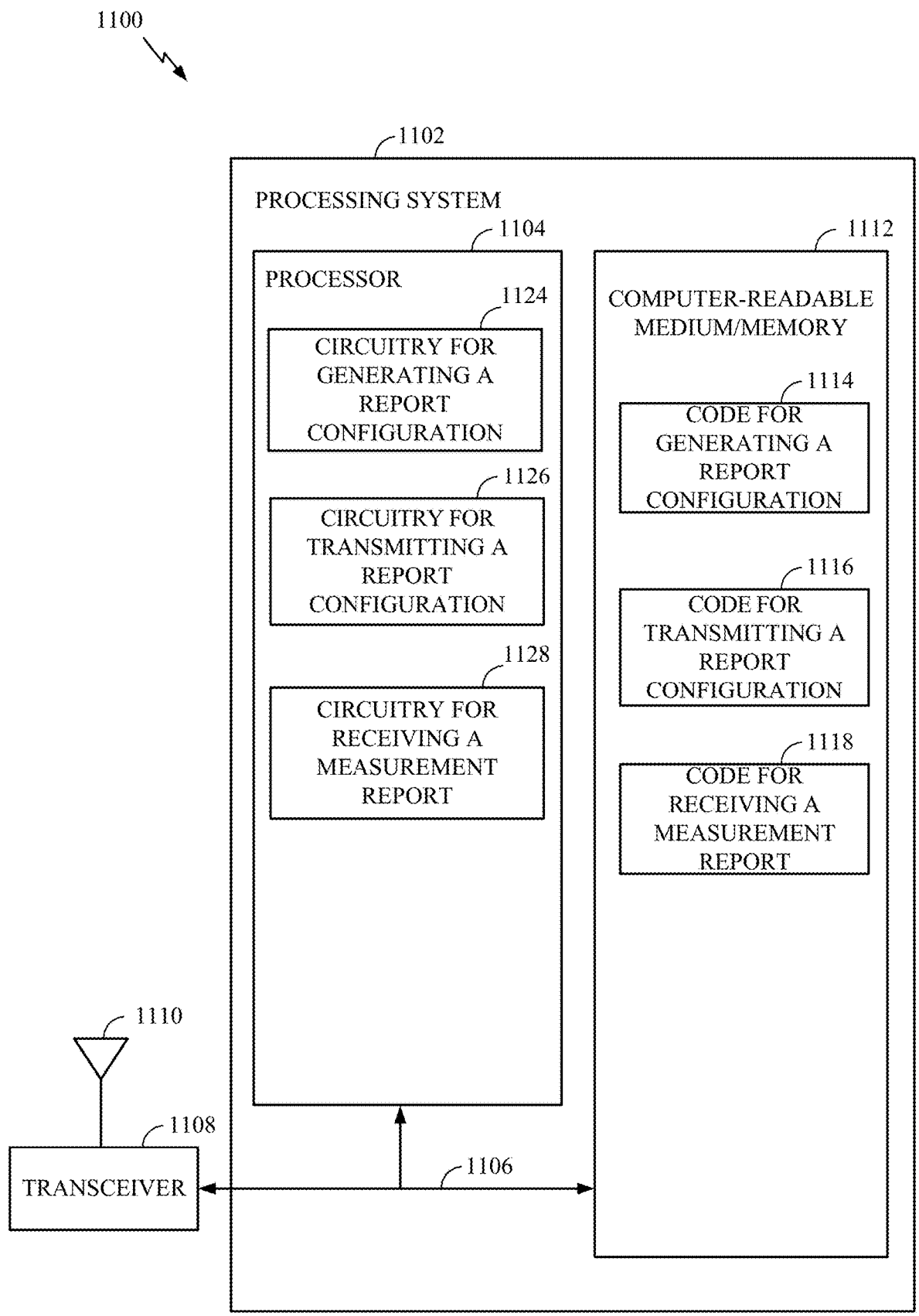
FIG. 11 depicts another example communications device that may include various components configured to perform operations for the techniques disclosed herein.

FIG. 11 depicts a communications device 1100 that may include various components (e.g., corresponding to means-plus-function components) configured to perform operations for the techniques disclosed herein, such as the operations illustrated in FIGS. 5, 6B, 7, 8B, and 9B. In some aspects, communications device 1000 may be a base station, such as BS 110 described with respect to FIGS. 1 and 2.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 5, 6B, 7, 8B, and 9B, or other operations for performing the various techniques discussed herein for enhanced beam reporting in single-frequency network (SFN) environments within a radio access network.

In certain aspects, computer-readable medium/memory 1112 stores code 1114 for generating a report configuration; code 1116 for transmitting a report configuration; and code 1118 for receiving a measurement report. In certain aspects, the processor 1104 has circuitry configured to implement the code stored in the computer-readable medium/memory 1112. The processor 1104 includes circuitry 1124 for generating a report configuration; circuitry 1126 for transmitting a report configuration; and circuitry 1128 for receiving a measurement report.

Notably, FIG. 11 is just one example, and other examples with further circuitry and further code configured to perform the various functions described herein are possible.

Example Clauses

Implementation examples are described in the following numbered clauses:

Clause 1: A method for performing beam measurements in a wireless communication network, comprising: performing a measurement of a first beam from a first transmission and reception point (TRP) of a network; performing a measurement of a second beam from a plurality of TRPs of the network; applying a biasing factor to one of the measurement of the first beam or the measurement of the second beam based on a beam preference setting; and transmitting, to the network, a measurement report comprising: indications of the first beam and second beam to which the measurement report pertains; and the measurement of the first beam and the measurement of the second beam after applying the biasing factor.

Clause 2: The method of Clause 1, further comprising: determining a strongest beam based on the measurement of the first beam and the measurement of the second beam after applying the biasing factor, wherein the measurement report further comprises: a measurement of the strongest beam reported as an actual value, and one or more measurements of one or more other beams, other than the strongest beam, reported as differential values.

Clause 3: The method of any one of Clauses 1-2, wherein the measurement of the first beam and the measurement of the second beam comprise Layer 1 received-signal received-power (L1-RSRP) measurements.

Clause 4: The method of any one of Clauses 1-2, wherein the measurement of the first beam and the measurement of the second beam comprise Layer 1 signal-to-interference-plus-noise ratio (L1-SINR) measurements.

Clause 5: The method of any one of Clauses 1-4, further comprising: receiving, from the network, a report configuration, comprising: a set of reference signals to measure corresponding to at least the first beam and the second beam; and a quantity type to report for the measurement of the first beam and the measurement of the second beam.

Clause 6: The method of any one of Clauses 1-5, further comprising: receiving, from the network, a first report configuration, comprising: a first set of reference signals to measure corresponding to the first beam; a second set of reference signals to measure corresponding to the second beam; and a quantity type to report for the measurement of the first beam and the measurement of the second beam.

Clause 7: A method for performing beam measurements in a wireless communication network, comprising: transmitting to a user equipment a report configuration, comprising: a set of reference signals to measure corresponding to at least a first beam and a second beam; and a quantity type to report for a measurement of the first beam and a measurement of the second beam, wherein: the first beam is configured to be transmitted by a first transmission and reception point (TRP) of a network, and the second beam is configured to be transmitted by a plurality of TRPs of the network; and receiving from the user equipment a measurement report comprising the measurement of the first beam and the measurement of the second beam after a biasing factor has been applied by the user equipment to at least one of the measurement of the first beam or the measurement of the second beam.

Clause 8: The method of Clause 7, wherein the measurement report further comprises: a measurement of a strongest beam reported as an absolute value, and a measurement of one or more other beams, other than the strongest beam, reported as a differential value.

Clause 9: The method of any one of Clauses 7-8, wherein the quantity type comprises a Layer 1 received-signal received-power (L1-RSRP).

Clause 10: The method of any one of Clauses 7-8, wherein the quantity type comprises a Layer 1 signal-to-interference-plus-noise ratio (L1-SINK).

Clause 11: A method for performing beam measurements in a wireless communication network, comprising: performing first measurements of a first plurality of beams from a first transmission and reception point (TRP) of a network; performing second measurements of a second plurality of beams, wherein each beam of the second plurality of beams is from a plurality of TRPs of the network; selecting a best beam from the first plurality of beams based on the first measurements; selecting a best beam from the second plurality of beams based on the first measurements; transmitting, to the network, a measurement report comprising: a measurement of the best beam from the first plurality of beams; and a measurement of the best beam from the second plurality of beams.

Clause 12: The method of Clause 11, wherein: the measurement of the best beam from the first plurality of beams comprises a first actual value of a measurement quantity type, the measurement of the best beam from the second plurality of beams comprises a second actual value of the measurement quantity type, and the measurement report further comprises: one or more measurements of one or more other beams in the first plurality of beams, other than the best beam from the first plurality of beams, reported as differential values of the measurement quantity type; and one or more measurements of one or more other beams in the second plurality of beams, other than the best beam from the second plurality of beams, reported as differential values of the measurement quantity type.

Clause 13: The method of Clause 12, wherein: the differential values associated with the one or more other beams in the first plurality of beams use a first quantization size, and the differential values associated with the one or more other beams in the second plurality of beams use a second quantization size, different from the first quantization size.

Clause 14: The method of Clause 12, wherein the differential values associated with the one or more other beams in the first plurality of beams and the differential values associated with the one or more other beams in the second plurality of beams use a same quantization size.

Clause 15: The method of any one of Clauses 11-14, wherein the first measurements of the first plurality of beams and the second measurements of the second plurality of beams comprise Layer 1 received-signal received-power (L1-RSRP) measurements.

Clause 16: The method of any one of Clauses 11-14, wherein the first measurements of the first plurality of beams and the second measurements of the second plurality of beams comprise Layer 1 signal-to-interference-plus-noise ratio (L1-SINK) measurements.

Clause 17: The method of any one of Clauses 11-16, further comprising: receiving, from the network, a report configuration, comprising: a set of reference signals to measure corresponding to at least the first plurality of beams and the second plurality of beams; and a quantity type to report for the measurements of the first plurality of beams and the measurements of the second plurality of beams.

Clause 18: The method of any one of Clauses 11-17 1, wherein: the first plurality of beams comprise non-single-frequency network (SFN) beams, and the second plurality of beams comprise SFN beams.

Clause 19: A method for performing beam measurements in a wireless communication network, comprising: transmitting to a user equipment a report configuration, comprising: a set of reference signals to measure corresponding to a first plurality of beams from a first transmission and reception point (TRP) of a network and a second plurality of beams from a plurality of TRPs of the network; and a quantity type to report for measurements of the first plurality of beams and measurement of the second plurality of beams; and receiving from the user equipment a measurement report comprising: a measurement of a best beam from the first plurality of beams; and a measurement of a best beam from the second plurality of beams.

Clause 20: The method of Clause 19, wherein: the measurement of the best beam from the first plurality of beams comprises a first actual value of a measurement quantity type, the measurement of the best beam from the second plurality of beams comprises a second actual value of the measurement quantity type, and the measurement report further comprises: one or more measurements of one or more other beams in the first plurality of beams, other than the best beam from the first plurality of beams, reported as differential values of the measurement quantity type; and one or more measurements of one or more other beams in the second plurality of beams, other than the best beam from the second plurality of beams, reported as differential values of the measurement quantity type.

Clause 21: The method of any one of Clauses 19-20, wherein the quantity type comprises one of a Layer 1 received-signal received-power (L1-RSRP) or a Layer 1 signal-to-interference-plus-noise ratio (L1-SINR).

Clause 22: A method for performing beam measurements in a wireless communication network, comprising: performing first measurements of a first plurality of beams from a first transmission and reception point (TRP) of a network; performing second measurements of a second plurality of beams, wherein each beam of the second plurality of beams is from a plurality of TRPs of the network; selecting a best beam from the first plurality of beams and the second plurality of beams based on the first measurements and the second measurements; transmitting, to the network, a measurement report comprising: a measurement of the best beam; and an indication of whether the best beam is received from the first TRP or the plurality of TRPs.

Clause 23: The method of Clause 22, wherein: the measurement of the best beam comprises an actual value of a measurement quantity type, the measurement report further comprises one or more measurements of one or more other beams from one or both of the first plurality of beams and the second plurality of beams, other than the best beam, reported as differential values of the measurement quantity type, and each respective measurement of the one or more measurements of the one or more other beams comprises an indication of whether the respective beam is received from the first TRP or the plurality of TRPs.

Clause 24: The method of Clause 23, further comprising: quantizing the differential values using a first quantization size or a second quantization size based on the indication of whether the best beam is received from the first TRP or the plurality of TRPs.

Clause 25: The method of any one of Clauses 23-24, wherein measurement quantity type comprises a Layer 1 received-signal received-power (L1-RSRP).

Clause 26: The method of any one of Clauses 23-24, wherein the measurement quantity type comprises a Layer 1 signal-to-interference-plus-noise ratio (L1-SINK) measurements.

Clause 27: The method of any one of Clauses 22-26, further comprising: receiving, from the network, a report configuration, comprising: a set of reference signals to measure corresponding to at least the first plurality of beams and the second plurality of beams; and a quantity type to report for the first measurements of the first plurality of beams and the second measurements of the second plurality of beams.

Clause 28: A method for performing beam measurements in a wireless communication network, comprising: transmitting to a user equipment a report configuration, comprising: a set of reference signals to measure corresponding to a first plurality of beams from a first transmission and reception point (TRP) of a network and a second plurality of beams, wherein each beam of the second plurality of beams is from a plurality of TRPs of the network; and a quantity type to report for measurements of the first plurality of beams and measurements of the second plurality of beams; and receiving from the user equipment a measurement report comprising: a measurement of a best beam from the first plurality of beams and the second plurality of beams; and an indication of whether the best beam is received from the first TRP or the plurality of TRPs.

Clause 29: The method of Clause 28, wherein: the measurement of the best beam comprises an actual value of a measurement quantity type, the measurement report further comprises one or more measurements of one or more other beams from one or both of the first plurality of beams and the second plurality of beams, other than the best beam, reported as differential values of the measurement quantity type, and each respective measurement of the one or more measurements of the one or more other beams comprises an indication of whether the respective beam is received from the first TRP or the plurality of TRPs.

Clause 30: The method of Clause 29, wherein the quantity type comprises a Layer 1 received-signal received-power (L1-RSRP).

Clause 31: The method of Clause 29, wherein the quantity type comprises a Layer 1 signal-to-interference-plus-noise ratio (L1-SINK).

Clause 32: A processing system, comprising: a memory comprising computer-executable instructions; one or more processors configured to execute the computer-executable instructions and cause the processing system to perform a method in accordance with any one of Clauses 1-31.

Clause 33: A processing system, comprising means for performing a method in accordance with any one of Clauses 1-31.

Clause 34: A non-transitory computer-readable medium comprising computer-executable instructions that, when executed by one or more processors of a processing system, cause the processing system to perform a method in accordance with any one of Clauses 1-31.

Clause 35: A computer program product embodied on a computer-readable storage medium comprising code for performing a method in accordance with any one of Clauses 1-31.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-9B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for performing beam measurements in a wireless communication network, comprising:
   performing first measurements of a first plurality of beams from a first transmission and reception point (TRP) of a network, wherein the first plurality of beams comprise non-single- frequency network (SFN) beams;
   performing second measurements of a second plurality of beams, wherein each beam of the second plurality of beams is from a plurality of TRPs of the network, and wherein the second plurality of beams comprise SFN beams;
   applying a first biasing factor to the first measurements based on the non-SFN beams and a second biasing factor to the second measurements based on the SFN beams, wherein the first biasing factor is different than the second biasing factor, wherein the second biasing factor is equal to one minus the first biasing factor;
   selecting a best beam from the first plurality of beams based on the first measurements;
   selecting a best beam from the second plurality of beams based on the second measurements; and
   transmitting, to the network, a measurement report comprising:
       a measurement of the best beam from the first plurality of beams; and
       a measurement of the best beam from the second plurality of beams.

2. The method of claim 1, wherein:
   the measurement of the best beam from the first plurality of beams comprises a first actual value of a measurement quantity type,
   the measurement of the best beam from the second plurality of beams comprises a second actual value of the measurement quantity type, and
   the measurement report further comprises:
       one or more measurements of one or more other beams in the first plurality of beams, other than the best beam from the first plurality of beams, reported as differential values of the measurement quantity type; and one or more measurements of one or more other beams in the second plurality of beams, other than the best beam from the second plurality of beams, reported as differential values of the measurement quantity type.

3. The method of claim 2, wherein:
the differential values associated with the one or more other beams in the first plurality of beams use a first quantization size, and
the differential values associated with the one or more other beams in the second plurality of beams use a second quantization size, different from the first quantization size.

4. The method of claim 2, wherein the differential values associated with the one or more other beams in the first plurality of beams and the differential values associated with the one or more other beams in the second plurality of beams use a same quantization size.

5. The method of claim 1, wherein the first measurements of the first plurality of beams and the second measurements of the second plurality of beams comprise Layer 1 received-signal received-power (L1-RSRP) measurements.

6. The method of claim 1, wherein the first measurements of the first plurality of beams and the second measurements of the second plurality of beams comprise Layer 1 signal-to-interference-plus-noise ratio (L1-SINR) measurements.

7. The method of claim 1, further comprising receiving, from the network, a report configuration comprising a set of reference signals to measure corresponding to at least the first plurality of beams and the second plurality of beams.

8. The method of claim 7, wherein the report configuration further comprises a quantity type to report for the measurements of the first plurality of beams and the measurements of the second plurality of beams.

9. A user equipment, comprising:
a memory comprising executable instructions; and
one or more processors configured to cause the user equipment to:
perform first measurements of a first plurality of beams from a first transmission and reception point (TRP) of a network, wherein the first plurality of beams comprise non-single-frequency network (SFN) beams;
perform second measurements of a second plurality of beams, wherein each beam of the second plurality of beams is from a plurality of TRPs of the network, and wherein the second plurality of beams comprise SFN beams;
apply a first biasing factor to the first measurements based on the non-SFN beams and a second biasing factor to the second measurements based on the SFN beams, wherein the first biasing factor is different than the second biasing factor, wherein the second biasing factor is equal to one minus the first biasing factor;
select a best beam from the first plurality of beams based on the first measurements;
select a best beam from the second plurality of beams based on the second measurements; and
transmit, to the network, a measurement report comprising:
a measurement of the best beam from the first plurality of beams; and
a measurement of the best beam from the second plurality of beams.

10. The user equipment of claim 9, wherein:
the measurement of the best beam from the first plurality of beams comprises a first actual value of a measurement quantity type,
the measurement of the best beam from the second plurality of beams comprises a second actual value of the measurement quantity type, and
the measurement report further comprises:
one or more measurements of one or more other beams in the first plurality of beams, other than the best beam from the first plurality of beams, reported as differential values of the measurement quantity type; and
one or more measurements of one or more other beams in the second plurality of beams, other than the best beam from the second plurality of beams, reported as differential values of the measurement quantity type.

11. The user equipment of claim 10, wherein:
the differential values associated with the one or more other beams in the first plurality of beams use a first quantization size, and
the differential values associated with the one or more other beams in the second plurality of beams use a second quantization size, different from the first quantization size.

12. The user equipment of claim 10, wherein the differential values associated with the one or more other beams in the first plurality of beams and the differential values associated with the one or more other beams in the second plurality of beams use a same quantization size.

13. The user equipment of claim 9, wherein the first measurements of the first plurality of beams and the second measurements of the second plurality of beams comprise Layer 1 received-signal received-power (L1-RSRP) measurements.

14. The user equipment of claim 9, wherein the first measurements of the first plurality of beams and the second measurements of the second plurality of beams comprise Layer 1 signal-to-interference-plus-noise ratio (L1-SINR) measurements.

15. The user equipment of claim 9, wherein the one or more processors are further configured to cause the user equipment to receive, from the network, a report configuration comprising a set of reference signals to measure corresponding to at least the first plurality of beams and the second plurality of beams.

16. The user equipment of claim 15, wherein the report configuration further comprises a quantity type to report for the measurements of the first plurality of beams and the measurements of the second plurality of beams.

17. A non-transitory computer-readable medium comprising executable instructions that, when executed by one or more processors of a processing system, cause the processing system to perform a method for performing beam measurements in a wireless communication network, the method comprising:
performing first measurements of a first plurality of beams from a first transmission and reception point (TRP) of a network, wherein the first plurality of beams comprise non-single-frequency network (SFN) beams;
performing second measurements of a second plurality of beams, wherein each beam of the second plurality of beams is from a plurality of TRPs of the network, and wherein the second plurality of beams comprise SFN beams;
applying a first biasing factor to the first measurements based on the non-SFN beams and a second biasing factor to the second measurements based on the SFN beams, wherein the first biasing factor is different than the second biasing factor;
selecting a best beam from the first plurality of beams based on the first measurements;
selecting a best beam from the second plurality of beams based on the second measurements; and
transmitting, to the network, a measurement report comprising:
a measurement of the best beam from the first plurality of beams; and
a measurement of the best beam from the second plurality of beams.

18. The non-transitory computer-readable medium of claim 17, wherein:
the measurement of the best beam from the first plurality of beams comprises a first actual value of a measurement quantity type,
the measurement of the best beam from the second plurality of beams comprises a second actual value of the measurement quantity type, and
the measurement report further comprises:
one or more measurements of one or more other beams in the first plurality of beams, other than the best beam from the first plurality of beams, reported as differential values of the measurement quantity type, and
one or more measurements of one or more other beams in the second plurality of beams, other than the best beam from the second plurality of beams, reported as differential values of the measurement quantity type.

19. The non-transitory computer-readable medium of claim 18, wherein:
the differential values associated with the one or more other beams in the first plurality of beams use a first quantization size, and
the differential values associated with the one or more other beams in the second plurality of beams use a second quantization size, different from the first quantization size.

20. The non-transitory computer-readable medium of claim 18, wherein the differential values associated with the one or more other beams in the first plurality of beams and the differential values associated with the one or more other beams in the second plurality of beams use a same quantization size.

21. The non-transitory computer-readable medium of claim 17, wherein the first measurements of the first plurality of beams and the second measurements of the second plurality of beams comprise Layer 1 received-signal received-power (L1-RSRP) measurements.

22. The non-transitory computer-readable medium of claim 17, wherein the first measurements of the first plurality of beams and the second measurements of the second plurality of beams comprise Layer 1 signal-to-interference-plus-noise ratio (L1-SINR) measurements.

23. The non-transitory computer-readable medium of claim 17, wherein the method further comprises receiving, from the network, a report configuration comprising a set of reference signals to measure corresponding to at least the first plurality of beams and the second plurality of beams.

24. The non-transitory computer-readable medium of claim 23, wherein the report configuration further comprises a quantity type to report for the measurements of the first plurality of beams and the measurements of the second plurality of beams.

25. A method for performing beam measurements in a wireless communication network, the method comprising:
transmitting to a user equipment a report configuration, comprising:
a set of reference signals to measure corresponding to a first plurality of beams from a first transmission and reception point (TRP) of a network and a second plurality of beams from a plurality of TRPs of the network, wherein the first plurality of beams comprise non-single-frequency network (SFN) beams and the second plurality of beams comprise SFN beams; and
a quantity type to report for measurements of the first plurality of beams and measurement of the second plurality of beams; and
receiving from the user equipment a measurement report comprising:
a measurement of a best beam from the first plurality of beams; and
a measurement of a best beam from the second plurality of beams, wherein the measurement of the best beam from the first plurality of beams and the measurement of the best beam from the second plurality of beams comprise a measurement after a first biasing factor has been applied by the user equipment to the measurement of the best beam from the first plurality of beams based on the non-SFN beams and a second biasing factor has been applied by the user equipment to the measurement of the best beam from the second plurality of beams based on the SFN beams, wherein the first biasing factor is different than the second biasing factor, wherein the second biasing factor is equal to one minus the first biasing factor.

26. The method of claim 25, wherein:
the measurement of the best beam from the first plurality of beams comprises a first actual value of a measurement quantity type,
the measurement of the best beam from the second plurality of beams comprises a second actual value of the measurement quantity type, and
the measurement report further comprises:
one or more measurements of one or more other beams in the first plurality of beams, other than the best beam from the first plurality of beams, reported as differential values of the measurement quantity type; and
one or more measurements of one or more other beams in the second plurality of beams, other than the best beam from the second plurality of beams, reported as differential values of the measurement quantity type.

27. The method of claim 25, wherein the quantity type comprises one of a Layer 1 received-signal received-power (L1-RSRP) or a Layer 1 signal-to-interference-plus-noise ratio (L1-SINR).

28. The method of claim 1, wherein selecting the best beam from the second plurality of beams comprises selecting the best beam after applying the biasing factor to the second measurements.

29. The user equipment of claim 9, wherein the one or more processors are further configured to cause the user equipment to select the best beam from the second plurality of beams after applying the biasing factor to the second measurements.

30. The method of claim 1, wherein the second biasing factor is based on the first biasing factor.

* * * * *